United States Patent
Eisenbeiss et al.

(10) Patent No.: US 12,123,805 B2
(45) Date of Patent: Oct. 22, 2024

(54) METHOD AND TEST STAND FOR DETECTING TIRE PROPERTIES BY GENERATING TIRE FORCE DATA VS TIRE SPEED AND TIRE FREQUENCY

(71) Applicant: ZF Friedrichshafen AG, Friedrichshafen (DE)

(72) Inventors: Jens Eisenbeiss, Fuerstenzell (DE); Roland Bösl, Neuburg am Inn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 354 days.

(21) Appl. No.: 17/609,188

(22) PCT Filed: May 8, 2020

(86) PCT No.: PCT/EP2020/062854
§ 371 (c)(1),
(2) Date: Nov. 5, 2021

(87) PCT Pub. No.: WO2020/225417
PCT Pub. Date: Nov. 12, 2020

(65) Prior Publication Data
US 2022/0316989 A1    Oct. 6, 2022

(30) Foreign Application Priority Data
May 8, 2019    (DE) ..................... 10 2019 206 595.3

(51) Int. Cl.
*G01M 17/02*    (2006.01)
*G01M 1/04*    (2006.01)

(52) U.S. Cl.
CPC .......... *G01M 17/021* (2013.01); *G01M 1/045* (2013.01)

(58) Field of Classification Search
CPC ..... G01M 17/021; G01M 1/045; G01M 17/02
See application file for complete search history.

(56) References Cited

U.S. PATENT DOCUMENTS

| | | |
|---|---|---|
| 10,760,984 B2 | 9/2020 | Eisenbeiss et al. |
| 2015/0013453 A1 | 1/2015 | Lawson et al. |
| 2015/0300921 A1* | 10/2015 | Nicholson ............. G01M 17/02 73/146 |

FOREIGN PATENT DOCUMENTS

| | | |
|---|---|---|
| DE | 102 60 000 A1 | 7/2004 |
| DE | 10 2015 224 636 A1 | 6/2017 |

(Continued)

OTHER PUBLICATIONS

Weber, Rüdiger, and Hans-Georg Persch. "Frequency response of tires—Slip angle and lateral force." SAE Transactions (1976): 105-123. (Year: 1976).*

(Continued)

*Primary Examiner* — Eric S. McCall
*Assistant Examiner* — Timothy P Graves
(74) *Attorney, Agent, or Firm* — Finch & Maloney PLLC

(57) ABSTRACT

A method and test stand for determining tire properties of a vehicle tire which is rotatably positioned on a rim via a wheel bearing. The interior of vehicle tire is pressurized by a fluid and the vehicle tire is applied with a wheel load. The vehicle tire is accelerated to a final speed in accordance with a pre-determinable speed ramp. The vehicle tire, in accordance with a tire speed, undergoes an oscillation excitation and reacts to the oscillation excitation with an oscillation. The method includes continuously capturing an effective tire force of the vehicle tire in the wheel bearing, due to the oscillation, and creating a data set which shows the tire force over the tire speed and tire frequency, by applying a timing signal of the speed ramp to a Fourier transformation.

18 Claims, 3 Drawing Sheets

(56) References Cited

FOREIGN PATENT DOCUMENTS

EP        2955078 B1 * 10/2020  ............. B60C 19/00
WO     2014/092722 A1    6/2014

OTHER PUBLICATIONS

Erfassung von 3-D-Schwingungen an PKW-Reifen, ATZ, Jan. 2014, pp. 62-67, See German Search.
Flachenhafte Schwingungsmessung an rotierenden Bauteilen, Applikationsnote VIG-G-12, Polytec GmbH Optische Messsysteme, Apr. 2010, See German Search.
P. Zeller (Hrsg.), Handbuch Fahrzeugakustik, DOI 10.1007/978-3-8348-8657-6_17, Vieweg+Teubner Verlag, Springer Fachmedien Wiesbaden GmbH 2012, See German Search.
Tire Uniformity—Wikipedia—5, Feb. 2019, See German Search.
German Search Report Corresponding to 10 2019 206 595.3 mailed Apr. 2, 2020.
International Search Report Corresponding to PCT/EP2020/062854 mailed Aug. 3, 2020.
Written Opinion Corresponding to PCT/EP2020/062854 mailed Aug. 3, 2020.

* cited by examiner

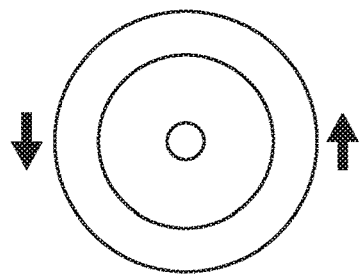
Fig. 1f
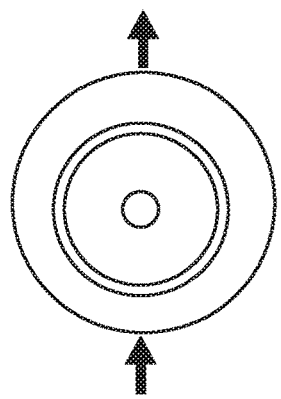
Fig. 1e
Fig. 1d
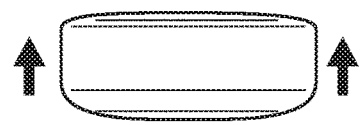
Fig. 1c
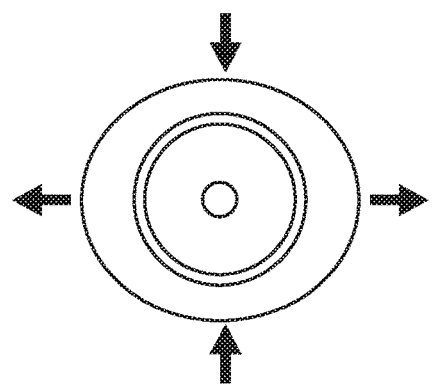
Fig. 1b
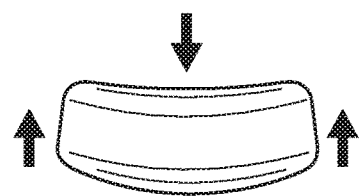
Fig. 1a

METHOD AND TEST STAND FOR DETECTING TIRE PROPERTIES BY GENERATING TIRE FORCE DATA VS TIRE SPEED AND TIRE FREQUENCY

This application is a National Stage completion of PCT/EP2020/062854 filed May 8, 2020, which claims priority from German patent application serial no. 10 2019 206 595.3 filed May 8, 2019.

FIELD OF THE INVENTION

The present invention concerns a method for the determination of the tire properties and a test stand for the determination of tire properties.

BACKGROUND OF THE INVENTION

Known in the state of the art are so-called "high-speed uniformity" measurements at vehicle tires through which the synchronization properties of the tires can be determined at high speed or tire rotational speeds, respectively. The synchronization includes hereby especially the presence of forces due to oscillation resonances at certain rotational speeds, whereby the oscillation resonances are generally unwanted. This excitation of oscillation resonances is hereby caused through different reasons such as stiffness variations, geometry mistakes, thickness variations, or imbalances of the vehicle tire. The tested tires need to be, regarding the frequency of the created resonances or regarding the amplitudes of the seen resonances, respectively, within given limits, suitable in each case for the respective application, for instance on a sports car or a truck.

In this context, the publication DE 102 60 000 B4 teaches a wheel power dynamometer for the measurement of tire forces, whereby a vehicle wheel is fixed installed at a wheel axis which is mounted with a roller bearing on a hollow shaft. The hollow shaft is hydro-statically installed in an enclosure of a frame and has an enclosure in which the power sensors are positioned for the measurement of forces. The forces which are acting at the wheel are therefore transmitted to the hollow shaft through the wheel axle which itself floats frictionless through hydrostatic in the enclosure.

Known through the publication DE 10 2015 224 636 A1 Is a wheel force dynamometer or the measurement of tire forces. Forces and torques which are present at a vehicle tire are measured by means of force sensors, whereby the vehicle wheel is mounted rotatable by means of a wheel axle. The wheel axle is designed as a hollow shaft and which is positioned bend-proof, locally present bearing pin. Hereby, the wheel axle presents a maximal resistive torque and a high a bending stiffness.

The known methods for the determination of tire properties in the framework of production control by means of the known fixtures have however disadvantages in a way that either oscillations are captured exclusively during definite defined speed steps or rotational speed steps, respectively. There is a risk, through the measurement and definite defined speeds, that interfering resonances are not detected during the production control. Thus, a reliable correlation cannot be established between a malfunction or a defect, respectively, of the vehicle tire and a monitored resonance. Small changes of the surrounding conditions of a measurement, such as temperature or pressure, can already shift a self-oscillation, and therefore the resonant frequency, in the direction of the interfering frequency or away from it. Therefore, significant changes of measurement results can partially occur.

SUMMARY OF THE INVENTION

It is the task of the invention to propose an improved method of the determination of tire properties.

The task is solved in view of the invention through the method of the determination of tire properties in accordance with the independent claim(s). Advantageous embodiments and continuation designs can be seen in the dependent claims.

The invention concerns a method for the determination of tire properties, whereby a vehicle tire is rotatably positioned via a wheel bearing on a rim, whereby the tire in its inner part is pressurized by a fluid, whereby the vehicle tire is impinged with a wheel load, whereby the vehicle tire is accelerated, in accordance with a pre-determinable speed ramp, moving to a final speed, and whereby the vehicle tire, based on a given tire speed, is stimulated to oscillation with a tire frequency. The invented method is characterized in that a tire force, which is created due to the oscillation of the vehicle tire at the wheel bearing, and that a data set is created which shows the tire force in relationship to the tire speed and the tire frequency, where a timing signal of the speed ramp is subject to a Fourier transformation.

It is also provided in accordance with the invention to determine tire properties of a vehicle tire, whereby a vehicle tire is accelerated which is rotatable positioned on a rim through a wheel bearing. The acceleration follows hereby a pre-determinable speed ramp whereby the speed ramp starts preferably at the tire speed zero, meaning with the standstill of the vehicle tire and it ends with the final speed. Alternatively preferred, the speed ramp can also start at a speed which is larger than zero. For instance, a speed range which is below the speed ramp can possibly be pursued quite fast before the proper speed ramp at defined test conditions, such as in particular in a defined in a pressure or in a defined wheel load, is passed through. The final speed is hereby also predetermined as well the increase of the tire speed, meaning the acceleration, whereby the speed ramp shall be preferably steady, meaning that the acceleration during the passing through the speed ramp can never become negative. Alternatively preferred, the speed ramp can also be passed through backwards, and meaning in particular exclusively a negative acceleration and no positive accelerations. It is also conceivable and preferred to pass multiple times through individual or several speed ranges of the speed ramp forward, meaning with positive acceleration and backwards, meaning with negative acceleration. A preferred acceleration of the speed ramp can for instance be 1 km and/hr. This acceleration represents in many cases a good compromise between a rapid passing through the speed ramp on one side and a sufficiently, high measurement accuracy on the other side. Because the vehicle tire has a bearing through the wheel bearing and that the wheel bearing is preferably a part of the test stand, the vehicle tire is, during the execution of the invented method, positioned locally in the test stand. Accordingly, the term "tire speed" in the sense of the invention is meant to be a rolling speed of the vehicle tire, for instance on a rolling drum or on a rolling belt. In the technical sense, the vehicle tire is accelerated to a determined angle speed and the "tire speed" in the sense of the invention is a result of the angle speed and the radius of the vehicle tire through multiplication. At a tire speed of more than zero, the vehicle tire rotates in the tire bearing which causes the excitement of the vehicle tire with speed dependent oscillations. Dependent on the natural tire frequency of the vehicle tire and the induced oscillations, the vehicle tire reacts with more or less intense oscillations. The closer the induced oscillations get to the natural frequency of the vehicle tire, the amplitudes of the oscillations to which the vehicle tire reacts, are getting stronger. The amplitudes achieve a maximum if an induced oscillation meets the natural frequency of the vehicle tire. One mentions in this case also that the induced oscillation meets the resonance of the vehicle tire. Therefore, a resonance of the vehicle tire can be recognized when the amplitude of an oscillation of the tire creates at least a local maximum. The oscillation behavior of the vehicle tire, meaning the frequency position of its self-oscillation or resonances, respectively, are not only created by its geometry, meaning for instance the size and the width, of the vehicle tire as well as a material characteristic, meaning for instance a stiffness, but also through a pressure application in its interior, as well through the wheel load. The amplitudes of the oscillation of the vehicle tire act as a detectable tire force at the wheel bearing where it can be captured or instance by means of accordingly designed and positioned force sensors. The force sensors capture hereby a static force which for instance, defined as wheel load, acts at the vehicle tire, as well as a dynamic force which is created through the rolling behavior of the vehicle tire at different speeds. The larger a captured tire force is after the deduction of the wheel load, the higher is naturally its underlying amplitude of the oscillation. Therefore, the captured tire force can advantageously be used as a measure for the actor to of the oscillation. The oscillations do not occur only in the first order but also in higher orders, so that amplitudes of oscillations of higher order and odd-numbered orders in the captured. The tire force is, in accordance with the invention, continuously captured during the complete passing through of the speed ramp, meaning not only at certain predetermined speed steps or in certain predetermined speed windows. A timing signal of the known speed ramp is then applied to a Fourier planet formation to create a descriptive data set of the tire force in relationship to the tire speed and the tire frequency. The timing signal is preferably a change of the captured tire force over the time during the passing through be speed ramp. Hereby, a static force, meaning in particular the wheel load, is eliminated from the data set.

As shown, the tire characteristics of a vehicle tire influence decisively the created data set, in particular and part of the data set, the tire force depending on the tire frequency at different tire speeds. An analysis of the data set enables hereby in reverse a reliable statement about the tire characteristics. The invention enables therefore in a simple way a mostly complete determination of the tire characteristics.

Since the data set comprises the tire force over the tire speed and over the tire frequency, in particular or oscillation of a multitude of different orders, it is therefore a three-dimensional data set which describes the tire force depending of the tire speed and of the tire frequency.

Hereby, the oscillations can occur along different oscillation degrees of freedom. Generally up to six different oscillation degrees of freedom can be seen.

Preferably, it is provided that the speed ramp does not only increase steadily or decreases, respectively, but increases or decreases, respectively, until reaching the end speed.

Also pressure oscillations can occur in addition to the tire oscillations which can be traced back to pressure differences or density differences, respectively, in the interior of the vehicle tire. The fluid as also hereby self-oscillations which are created on one side by the geometry of the vehicle tire, also by the size and width of the vehicle tire, but are created also on the other hand by the applied pressure and the wheel load. If the excitation oscillation impinges on the natural frequency of the fluid, a resonance of the fluid occurs accordingly. However, such resonances of the fluid do not play any significant role in an industrial production control because their position of the frequency, beside the already mentioned influence factors, are mainly determined by the applied rim brand on which the vehicle tire is mounted on. That means that resonances of the fluid, when a test rim is used which are common in the industrial production control occur at other frequencies and with amplitudes than during the use of a vehicle rim, as they are usually applied with motor vehicles. Since these resonances also commonly occur at higher frequencies or orders, respectively, than the presented tire oscillations in accordance with the invention, they can be neglected in the framework of the invented method.

It is provided in a preferred embodiment, in accordance with the invention, that the Fourier transformation is a fast Fourier transformation. Hereby, the fast Fourier transformation is an algorithm fora comparable, efficient, and fast calculation of the so-called discrete Fourier transformation, hereby, the invented creation of the data set is made simpler and accelerated, at the same time, less computing power is needed for the execution of the Fourier transformation.

In accordance of an additional preferred embodiment of the invention, it is provided that the data set for each pair of values of tire speed and tire frequency comprises a tire force value. Thus, the tire force is not only captured continuously, but the continuously captured tire force values are used for the creation of the inner set so that the inner set as also be continuously captured tire force value. Therefore, the data set is much more comprehensive as compared to data sets in accordance with the state of technology. The consideration of the tire characteristics is hereby not limited to single measurement ranges. It is, however, also a finding of the invention that certain defects or unwanted tire characteristics, respectively, do not occur or can be recognized in all speed ranges or frequency ranges, respectively.

In accordance with an additional preferred embodiment of the invention, it is provided that a classification of the tire characteristics takes place, whereby the tire force is compared with a reference force in a prearranged and established window, through a tire frequency spectrum as well as a tire speed spectrum. The windows presets hereby, over the tire frequency spectrum and the tire speed spectrum, in each case an adaptable frame, in which the tire force cannot exceed a determined preset value so that the vehicle tire can be provided with a respective classification. If the tire force hereby does not exceed the preset reference force in an established window, over the tire frequency spectrum and the tire speed spectrum, the vehicle tire will be classified accordingly. Otherwise, the vehicle tire will not be classified or negatively declassified in the sense that the tire force exceeds in several places the preset reference force in the established window over the tire frequency spectrum over the tire speed spectrum. It can hereby be already sufficient if only just a single amplitude of the resonances of the fluid exceeds its assigned reference amplitude to not classify the vehicle tire or negatively classify it, respectively. The window comprises at least one reference amplitude or also several reference amplitudes.

It is especially preferably provided that a multitude of tire forces is compared with a multitude of reference forces in a multitude of established windows through the preset tire frequency spectrum and the tire speed spectrum. Thus, the vehicle tire can be classified in view of a multitude of different tire characteristics.

Preferably, the classification takes place automatically in the form of a software algorithm which is executed by an especially designed electronic control unit.

In accordance with an especially preferred embodiment of the invention, it is provided that the window or the multitude of windows, respectively, are predetermined based on the intended use of the vehicle tire. The advantage hereby is that the vehicle tire can be classified in a simple way in each window for the assigned and intended use. For example, the requirements for a vehicle tire for a sports car differ from the requirements for a vehicle tire for an SUV, truck or agricultural machine.

It is provided, in accordance with an additional especially preferred embodiment of the invention, that an order of a resonance of the tire frequency which occurs in the data set is assigned to a cause of the resonance. A resonance occurs hereby always at the time when the oscillation, in which the vehicle tire is excited, corresponds with a self-oscillation of the vehicle tire. In this case, a strong increase of the amplitude of the oscillation occurs. It turned out that be different orders of the monitored resonances are based on different causes, whereby the causes by themselves are based on the tire characteristics which need to be determined. Thus, in a relatively simple art and manner, based on the order of a monitored resonance, in particular with the consideration of the exciting frequency-dependent occurring and diminishing of the resonances, a certain pattern of a specific tire characteristic can be concluded. The larger than the amplitude of the monitored oscillation is, meaning the more pronounced the oscillation is, the more pronounced is generally also the respective tire characteristic.

It is provided in accordance with an especially preferred embodiment of the invention that a resonance of the first order will be assigned as an eccentricity and/or an imbalance. As it turned out, eccentricities or imbalances, respectively, of a vehicle tire can be recognized based on the behavior of a resonance during the oscillation of a first order. The more pronounced hereby the amplitude is, the more pronounced the amplitude which causes the eccentricity or imbalance is, respectively. It is hereby generally valid that a resonance of the first order, which can mainly be traced back to an imbalance, behaves quadratically as compared to the tire speed, meaning that at low speeds the amplitude is relatively low and that with an increasing tire speed it increases exponentially. When a resonance of the first order can be traced back mainly to an eccentricity, it behaves in reference to its amplitude mainly independently from the tire speed, meaning it remains constant in its characteristic. If an eccentricity and an imbalance occur at the same time, a extinction of the monitored amplitude can happen in a certain range of the tire speed because the amplitude caused by the imbalance and the amplitude caused by the eccentricity have a phase offset of 180°. By having the data set in accordance with the invention not limited to one or several speed ranges such a behavior, meaning for instance the mutual deletion of the amplitudes, can be recognized as advantageous and be used for the specification of the tire characteristics.

It is provided in an additional especially preferred embodiment of the invention that a resonance of second order gets an assigned ovality. As it turned out, an unwanted ovality, meaning a deviation from the desired circular shape of their vehicle tire, can lead to a resonance of the second order.

It is provided in accordance with an additional especially preferred embodiment of the invention that a resonance in an n-order has an assigned construction defect or a design defect. A construction defect or design defect is hereby a defect which leads to a deviation from the wanted circular in shape of the vehicle tire, either two of a defect in construction of the different layers of which the tire has been fabricated with, or due to a defect during the vulcanization of the vehicle tire. The n-order of a construction defect or a design defect is hereby understood as the value n of the deviations from the circular shape. A deformed tire at three locations leads to the creation of an excitation of the third order. The construction defects or design defects can hereby be very minimal, for instance just 0.5 mm from the ideal shape of the vehicle tire, so that it can only be recognized by their created resonance.

It is provided in accordance with an additional especially preferred embodiment of the invention that a non-linear effect is designed to a resonance of an odd order. In known methods of the state of the art, a resonance of an odd order is by default eliminated, and is not considered at all for the description of the tire characteristics. This preferred embodiment of the invention not only includes the resonance of odd order, but uses it also advantageously for the description of the tire characteristics. A non-linear effect can therefore be or instance a material irregularity. A material irregularity can again occur for instance because of an uneven material distribution of the vehicle tire or even because of a material defect. Such resonances of odd order are in the state of the art not further considered, even though that they, with a respective excitation, can cause oscillations in a vehicle in which they are installed. Even if the concrete cause of a resonance of odd order which occurs cannot always be determined free of doubt, but the pure fact that the resonance occurs at a certain excitation, needs to be considered for a possible use of the vehicle tire.

It is provided in an additional especially preferred embodiment of the invention that the assigned tire forces which are assigned to an oscillation of an order are presented in as a curve plot over the tire speed, to calculate by means of a determined area under the curve an oscillation power. This results advantageously in a possibility that for one, several, and for all oscillations of different orders, which are all present in the data set, be tire force is in the tire speeds can be presented two-dimensional which again enables additional analyzing steps for the determination of the tire characteristics. Hereby the oscillations of different orders are each extracted from the data set, whereby the curve plot presents a tire force with are assigned to their respective order, depending on and the tire speed. Through the calculation of the area of such a curve, preferably by means of integration, the oscillation power can be determined. Because the oscillation power, during the use of the vehicle tire at a vehicle, is transferred through the wheel bearing of the vehicle it needs to be absorbed by it, it is advantageous to know and information about the oscillation power of the vehicle tire before its use with a vehicle.

Preferably, the classification of the tire properties takes place by comparing the oscillation power with a reference power. If the oscillation power is larger than the reference power, the vehicle tire will be preferably not classified. If however the oscillation power is lower than the reference power, the vehicle tire can be classified.

Especially preferred, for different provided application of the vehicle tire, different reference powers of the comparison are provided.

It is provided for a specially preferred embodiment of the invention that the classification of the tire properties takes place where the curve is compared with a reference curve. Contrary to a pure comparison of the oscillation power with a reference power, a comparison of the curve with the reference curve allows in comparison a more exact evaluation of the tire properties, because the curve not only describes the oscillation power alone but furthermore also the actual pattern, meaning its increase or decrease, respectively, its width, and its maximum. Thus, it provides information about in which tire speeds can expect which amplitudes or tire forces might occur. Therefore, also permissible maxima for the different curves can be defined which cannot exceeded. It becomes hereby possible to also recognize the ineptitude of a vehicle tire for a classification if for instance be oscillation power of the vehicle tire in total is below the reference power of however, but if tire powers occur in one or several tire speeds which appear to suggest that the vehicle tire is not suitable for an intended use.

It is provided in an additional especially preferred embodiment of the invention that the curves of different order can be approximated with a quadratic equation. A quadratically equation has usually the form elements "$ax^2+bx+c=0$", where a, b and c are the coefficients by means of whose adaptation the quadratic equation is approximated to the curve. It presents the advantage that the curve, and therefore the tire characteristics which are in the data set, can be described in an easy way through the equation, whereby different tire properties are hereby assigned to specific coefficients. It is therefore and for instance possible to compare the coefficients with the reference coefficients, which again enable an especially simple, fast, and reliable classification of the tire properties.

It is provided, in accordance with an additional especially preferred embodiment of the invention, that to a quadratic part of the equation an unevenness of the material distribution is assigned to it. The quadratic part of the equation is hereby presented through the term "$ax^2$". As it turned out, namely uneven parts in the material distribution of a vehicle tire, as well as material distribution defects of a vehicle tire, can be recognized based on the expression of the quadratic part "$ax^2$". The larger the coefficient "a" is, the more distinct is also the uneven part in the material distribution of the vehicle tire. Through the comparison with a reference coefficient, a classification of the vehicle tire can for instance take place regarding its uneven material distribution or material distribution defects, respectively, to determine if the vehicle tire is suitable or not for a provided usage. For instance, a requirement for a vehicle tire regarding its uneven material distribution can be significantly higher for any task rotating sports car tire as compared to a slow rotating truck tire.

It is provided in accordance with an additional especially preferred embodiment of the invention that a speed proportional mechanism is assigned to a linear part of the equation. As it turned out, speed proportional mechanisms of the vehicle tire can be recognized based on the expression of the linear part "bx".

It is provided in an additional especially preferred embodiment of the invention that to a constant part of the equation a design effect or a stiffness defect is assigned to. The constant part of the quadratic equation is presented hereby by the coefficient "c". As it turned out, the design defect or stiffness defect can be recognized based on the constant part "c".

It is provided in accordance with a preferred embodiment of the invention that an effective tire force can be achieved by creating a quadratic average value of the captured tire force of an order. The creation of the quadratic average value follows hereby preferably the so-called "Root-Mean-Square" method which allows a determination of an average tire force or where a pre-determinable frequency spectrum. The predetermined frequency spectrum is hereby preferably predetermined in a way that it in each case comprises a maximum. The effective tire force offers advantageously an additional possibility to classify the tire characteristics.

It is provided in an additional especially preferred embodiment of the invention that a classification of the tire characteristics takes place where the effective tire force is compared with an effective reference tire force. Thus, an additional advantageous possibility is available to classify the vehicle tire, by comparison and in a simple art and manner for an intended usage, if it is suitable or not suitable.

The invention further concerns a test stand for the determination of tire properties, comprising a rim, a wheel bearing, means to apply pressure vehicle tire, means to apply the vehicle tire with a wheel load means for the acceleration of the vehicle tire, means for capturing a tire speed, and means or capturing a tire force and/or a tire or oscillation, whereby the vehicle tire is rotatable by means of a rim through the wheel bearing, whereby the vehicle tire, by means of a pressure application, a pressure can be applied by means of a fluid, whereby the vehicle tire can be applied with a wheel load by means of a wheel load, whereby the vehicle tire can be accelerated by means for an acceleration of the vehicle tire in accordance with a pre-determinable speed ramp to an end speed so that the vehicle tire, in accordance with the tire speed, experiences an oscillation excitement and reacts hereby with an oscillation due to the oscillation excitement, and whereby the tire speed can be captured through means for capturing the tire speed. The invented test stand is characterized that a tire force, present due to the oscillation at the tire bearing, can be continuously captured by means of a capture tire force and/or tire oscillation, and that the test stand comprises in addition electronic computing means whereby the electronic computing means are designed in a way to create a data set which presents a tire force over the tire speed and over a tire frequency in which they apply a timing signal of the speed ramp to a Fourier transformation. The test stand comprises therefore all required means to execute the invented method.

The wheel bearing is preferably designed as a low friction bearing, for instance as hydrostatic slide bearing which enables the rotation of the vehicle tire.

It means for the acceleration are preferably designed as one or several electric motors which in particular, through a shiftable transmission or single or multiple fixed transmission steps, can create a rotational acceleration of the vehicle tire.

The means for the pressure application at the vehicle tire are preferably designed as a fluid pump, in particular as an air pump, for instance as membrane pump or rotary vane pump.

The means to apply the vehicle tire with a wheel load are preferably designed as controllable and regulated fluid cylinders which apply to the vehicle tire during the passing through the speed ramp with a pre-determinable tire load. The application with the tire load through the fluid cylinder can, for instance during at the passing through the speed ramp, be constant or can be controllably changed.

The means for capturing the tire speed are preferably designed in a way to capture a rotational angle per unit of time optically, magnetically, or electromagnetically.

The means to capture the tire force are preferably designed as force sensors which can also capture a relatively fast their change of the force or forces, in particular up to 300 Hz. Especially suitable as means to capture the tire force are advantageously the so-called piezo force sensors.

It is provided in a preferred embodiment of the invention that the test stand is designed to execute the invented method.

BRIEF DESCRIPTION OF THE DRAWINGS

In the following, the invention is exemplary explained based on the presented embodiments in the drawings.

It shows:

FIGS. 1a-1f schematically an overview about the six different oscillation degrees of freedom of a vehicle tire, FIG. 2 exemplary and schematically a created data set in accordance with the invention, FIG. 3 exemplary and schematically tire forces which are assigned to oscillations of different order, FIG. 4 exemplary and schematically an additional created data set in accordance with the invention, and FIG. 5 exemplary and schematically the data set in FIG. 4, whereby an effective tire force was created.

DETAILED DESCRIPTION OF THE PREFERRED EMBODIMENTS

Figure 2:
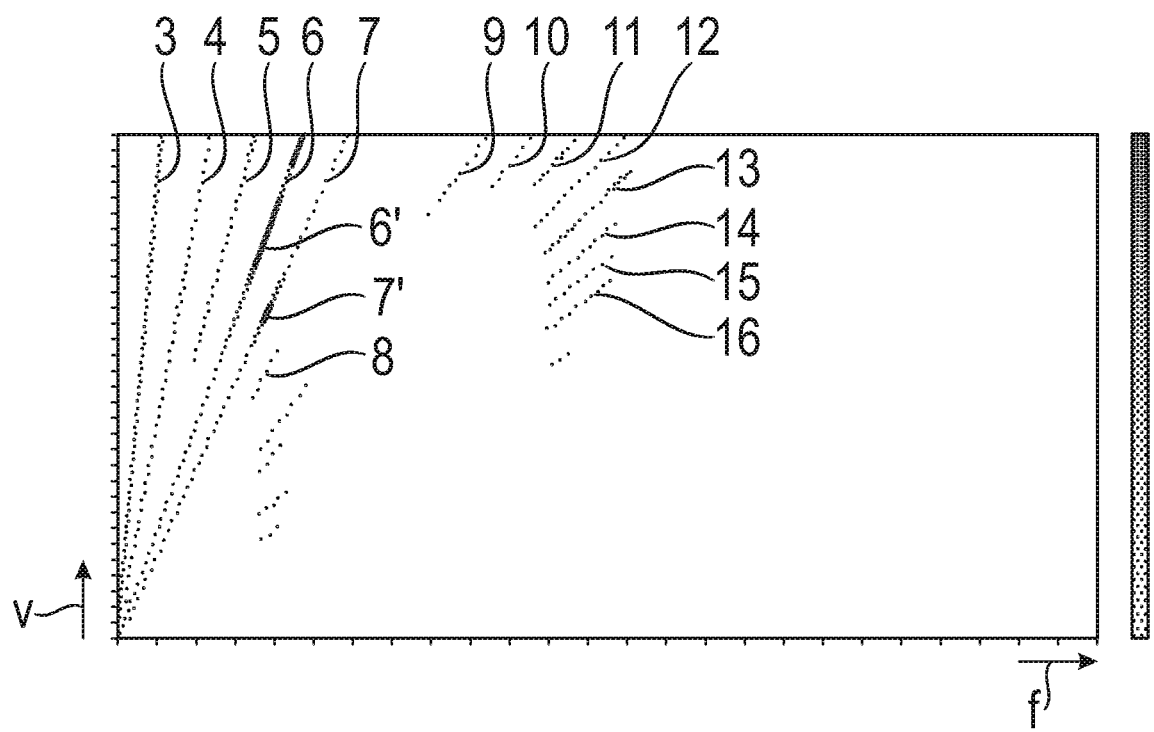

Same objects, functional units, and comparable components are marked, concerning all drawings, with the same reference characters. These objects, functional units and comparable components are designed identically with regard to their technical features, unless the description explicitly or implicitly states otherwise.

FIGS. 1a-1f schematically show an overview of the six different oscillation degrees of freedom of a vehicle tire 1 which is mounted on the rim 2. Along each of the presented oscillation degrees of freedom, also self-oscillations exist. These self-oscillations comprise beside the respective fundamental oscillation, which is generally called also an oscillation of the first order, or for instance as oscillation of second order or as oscillation of third order etc. A direction of the oscillations is in each case illustrated by an arrow at the vehicle tire 1. FIG. 1a shows of the first oscillation degree of freedom which allows and oscillation along the rotational direction of a running surface of the vehicle tire 1. Such an oscillation usually occurs often during the operation of the vehicle tire 1 in conjunction with tire slippage. A second degree of freedom is shown in FIG. 1b. Hereby, the vehicle tire 1 oscillates along a radial axis, forward and backward whereby opposite sides of the vehicle tire 1 oscillate in phase. FIG. 1c shows an additional possible oscillation degree of freedom whereby the vehicle tire 1, in accordance with the oscillation degrees of freedom shown in FIG. 1c, oscillates lateral to its drive direction, meaning along its rotational axis. All sides of the vehicle tire 1 oscillate here in phase. FIG. 1d shows again in an additional oscillation degree of freedom where the vehicle tire 1 is tilted, due to the oscillation with respect to its rotational axis. Again an additional oscillation degree of freedom can be seen in FIG. 1e, in accordance with the vehicle tire 1 oscillates similar to the oscillation in FIG. 1b, however, the oscillation in FIG. 1e takes place along two radial axis of the vehicle tire 1 with an offset of 90°. The oscillation along each of the radial axis is out of phase. Finally, FIG. 1f shows again in an additional oscillation degree of freedom of the vehicle tire 1 where the vehicle tire 1 also oscillates laterally along its rotational axis. However, the center of the vehicle tire 1 and outer areas of the vehicle tire 1 are oscillating out of phase.

FIG. 2 shows, by way of example and schematically, a data set generated according to the invention, which describes the tire force as a function of the tire speed and of the tire frequency. The data set was created where initially a vehicle tire 1 was rotatably mounted via a wheel bearing on a rim 2, by means of a fluid, exemplary by means of air, impinged in its interior with pressure and whereby the vehicle tire 1 was also accelerated from a standstill in accordance with a pre-determinable speed ramp to an end speed. While driving through the speed ramp, the vehicle tire 1 was subjected to a constant wheel load according to the example. As a result, the vehicle tire 1 was excited to oscillate at a tire frequency in accordance with a tire speed, which in turn led to a tire force acting on the wheel bearing, which was continuously recorded. A time signal of the speed ramp, for example a change in the detected tire force over time while driving through the speed ramp, was then subjected to a fast Fourier transformation. The tire speed as in FIG. 2 is hereby presented on the Y-axis and the tire frequency on the X-axis. The tire force can be recognized based on a color or hatching, respectively. As can be seen in FIG. 2, lines 3-16 are formed in the representation of the tire force as a function of the tire speed and as a function of the tire frequency, at which the tire force is greater than in the surrounding areas. These lines 3-16 show resonances of different orders. Where an excitation frequency meets a resonance of the vehicle tire 1 or a resonance of the fluid which is used for pressurization in the vehicle tire 1, a clear increase of the recorded tire force occurs. In accordance with the example, the lines 11-16 in the right section of the data set, meaning in the resonances at approximately 200 Hz, are hereby resonances which can be traced back to a pressure oscillation of the fluid in the vehicle tire 1. Because the amplitudes as well as the frequency positions of these resonances are characterized by the type rims used, and where for instance a test rim was used for the creation of the data set, these resonances are not suitable to classify the vehicle tire 1 for use on a conventional vehicle rim. As can further be seen, all presented lines in FIG. 2 run through the origin and are linear in reference to the tire speed and therefore to the rotational speed of the vehicle tire 1. Each specific position of the resonant frequencies of the vehicle tire 1 is characterized by the dimensions of the vehicle tire 1, as well as its mass, stiffness, its pressurization by the fluid and a wheel load. Each line 3-16 represents an oscillation of different order. The line 3 shows the oscillation of the first order, line 4 the oscillation of the second order, the line 5 the oscillation of the third order, line 6 the oscillation of the fourth order, etc. until line 16 which represents the oscillation of the 14$^{th}$ order. It can also be seen in FIG. 2 that the tire force in lines 6 and 7 clearly increases in the ranges 6' and 7'. In accordance with this example, the ranges 6' and 7' are each at a frequency of 75 Hz, because the vehicle tire 1 has here a strong resonance and the oscillation shows accordingly a large amplitude. For the evaluation whether the vehicle tire 1 is suitable for the intended use, exemplary as a vehicle tire 1 for a sports car, a classification of the tire properties takes place by comparing the captured tire force with a reference force in a pre-determinable established window and over a tire frequency spectrum as well as a tire speed spectrum. Since a sports car is usually expected also for the movement at high speeds, the window is established over a tire speed spectrum from zero to 300 km/h in over a tire speed spectrum in accordance with a tire frequency spectrum from zero to 200 Hz. Since the vehicle tire is expected to roll evenly, a reference force of 35 N is predetermined within this window. However, since the captured tire forces in the range 6' and 7' are positioned above 35 N, the tire properties are here classified in this example as not suitable for a sports car.

Figure 3:
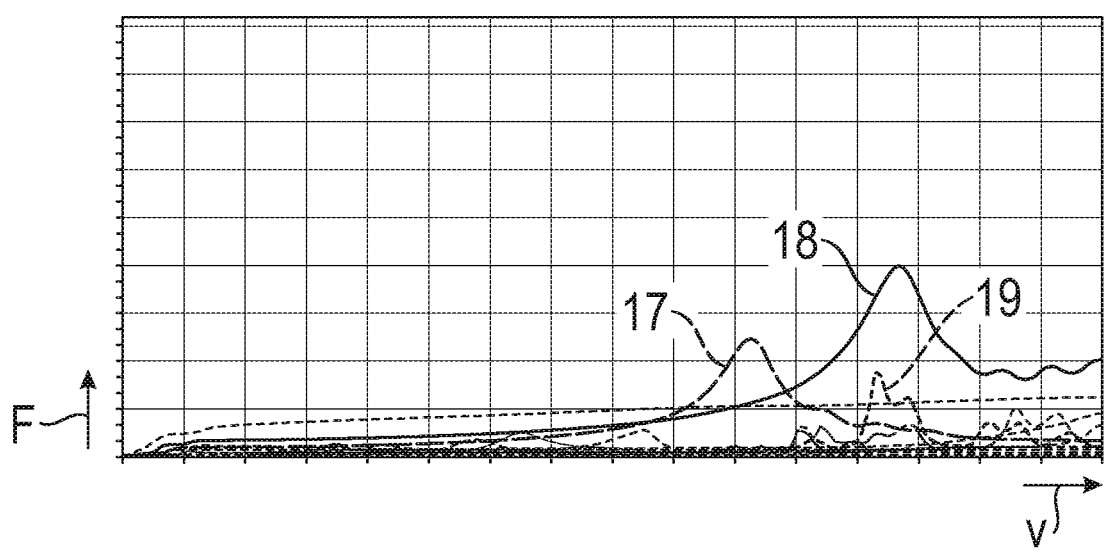

FIG. 3 schematically shows by way of example the tire forces which are assigned to oscillations of different orders, as curves 17, 18, 19 over the tire speed. Exemplarily presented are the oscillation of the first order 17, second order 18, and third order 19. By means of the determination of an area under the curves 17, 18, 19, an oscillation power of the oscillation is determined for the respective order. Each of the determined oscillation powers is now compared with each reference power and its respective order, to classify the tire properties. As in the example, the comparison indicates that the oscillation power which is assigned to the second order 18 is larger than the reference power which is assigned to the second order, so that the vehicle tire 1 is classified as not suitable for the intended use. The oscillation power assigned to the first order 17 and the third order 19 are below each of the respectively assigned reference power but an exceeding of the reference power assigned to the second order 18 is sufficient to classify the vehicle tire 1 as not suitable.

In accordance with an additional embodiment, also presented in FIG. 3, the curves 17, 18, and 19 are each approximated via a quadratic equation of the form $ax^2+bx+c=0$. The quadratic part "$ax^2$" of the equation is hereby assign to the imbalance, the linear part "$bx$" of the equation is assigned to a speed proportional mechanism, and the constant part "$c$" of the equation to a design defect or a stiffness defect. Thereafter, the coefficients a, b, and c of the quadratic equation are for each curve 17, 18, and 19 compared with reference coefficients. If the coefficients a, b, and c are each smaller than the respective reference coefficients, the vehicle tire 1 is classified as suitable for the intended use. Otherwise, the vehicle tire 1 is classified as not suitable for the intended use.

Figure 4:
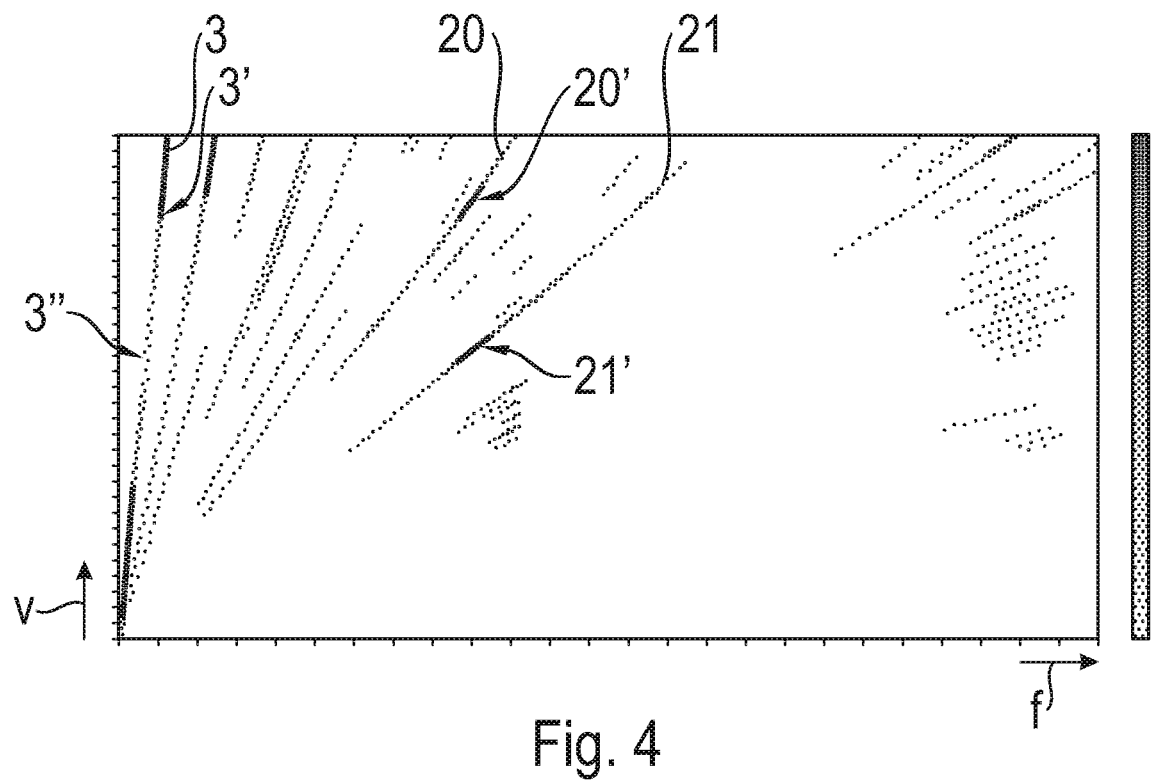

FIG. 4 shows, by way of example and schematically, a further data set generated according to the invention, which describes the tire force as a function of the tire speed and as a function of the tire frequency. The data set in FIG. 4 corresponds mainly with the data set in FIG. 2 but shows who the lines 20 and 21 in the areas 20' in 21' resonance oscillations of a non-integer order. In accordance with the example, the resonance oscillation in the areas 20' and 21' are each located at 175 Hz. Through a division with the frequency of each assigned resonance frequency of the first order and an identical tire speed, it produces the respective order of a resonance in the areas 20' and 21'. The frequency of the first order which is assigned to the resonant frequency in the area 20' can be taken from line 3 and a tire speed of 170 km/h, meaning in the area 3'. In accordance with the example, that frequency is 21.4 Hz which results for the resonant frequency in the area 20' in the non-integer order of 8.17. The order of the resonant frequency in the area 21' can analogically be determined. In accordance with the example, the frequency amounts to 14.3.Hz in the area 3" which results in a resonance frequency in the area 21' of a non-integer order 12.23. The appearance of the non-integer resonance frequencies in the area 20' and 21' are assigned with a material inconsistency of the vehicle tire 1. Thus, the data set as shown in FIG. 4 indicates the presence of a material inconsistency of the vehicle tire 1 and the vehicle tire 1 can be classified accordingly.

Figure 5:
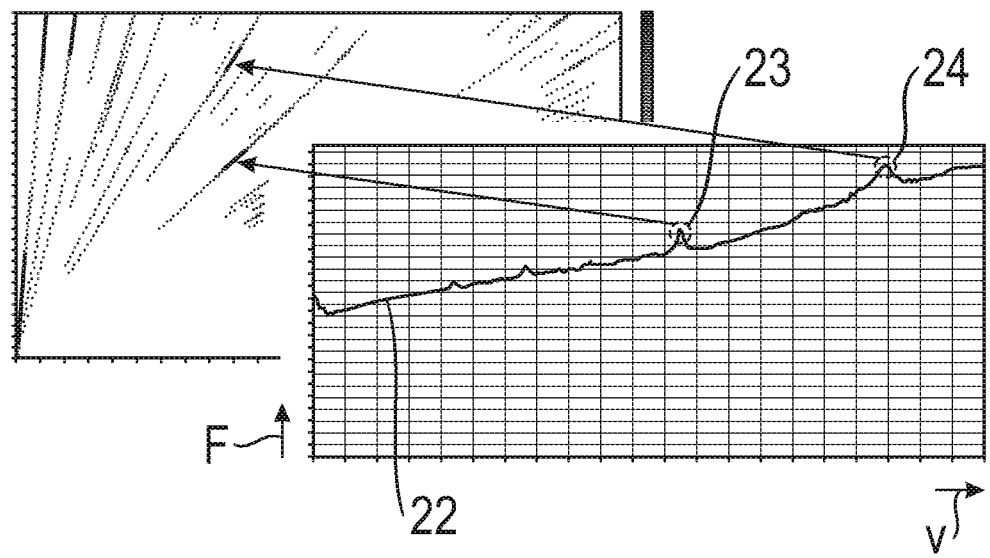

FIG. 5 shows exemplarily and schematically the data set of FIG. 4, whereby an effective tire force 22 was created through the formation of a quadratic average value of the captured tire force of one order. The formation of a quadratic average value is hereby executed in accordance with the example based on the so-called "Root-Mean-Square" method. The effective tire force is then presented as a function of the speed, whereby the speed-dependent maxima 23 and 24 of the effective tire force can be seen. The maxima 23 and 24 corresponds hereby with the frequencies in the areas 20' and 21' of the lines 20 and 21. Through the comparison with a reference curve, a classification of the tire properties can now take place, whereby the tire properties in accordance with the example are classified as suitable for the intended use, if the effective tire force 22 is lower for all speeds than the effective tire force. Otherwise, the tire properties are classified as not suitable for the intended use.

REFERENCE CHARACTERS

1 Vehicle Tire
2 Rim
3-16 Lines, excitation frequency
3', 3" Frequency Range
6', 7', 8' Area, in which the resonance frequency is located
17 Oscillation of the first order
18 Oscillation of the second order
19 Oscillation of the third order
20 Line, excitation frequency, resonance frequency
20' Area, in which the resonance frequency is located
21 Line, excitation frequency, resonance frequency
21' Area, in which the resonance frequency is located
22 Effective Tire Force
23, 24 Maxima of the effective tire force

The invention claimed is:

1. A method for determination of tire properties in which a vehicle tire is rotatably mounted on a rim via a wheel bearing, an interior of the vehicle tire is pressurized by a fluid, the vehicle tire is subjected to a wheel load, the vehicle tire being accelerated to a final speed in accordance with a pre-determinable speed ramp, and the vehicle tire, in accordance with a tire speed, undergoes oscillation excitation and reacts to the oscillation excitation with an oscillation, and the method comprising:

continually capturing an effective tire force of the vehicle tire in the wheel bearing, due to the oscillation, generating a data set, by applying a timing signal of the speed ramp to a Fourier transformation, which shows the tire force over the tire speed and tire frequency, assigning an order of a resonance of the tire frequency occurring in the data set to a cause of the resonance, and tire forces assigned to an oscillation of an order are represented as a generated curve over the tire speed to determine an oscillation power by determining an area under the curve.

2. The method according to claim 1, wherein the Fourier transformation is a fast Fourier transformation.

3. The method according to claim 1, wherein the data set for each value pair of tire speed and tire frequency comprises a tire force value.

4. The method according to claim 1, further comprising that classification of the tire properties takes place where the tire force is compared with a reference force in a predetermined and established reference force window and over a tire frequency spectrum as well as a tire speed spectrum.

5. The method according to claim 4, further comprising that the reference force window is predetermined for an intended use of the vehicle tire.

6. The method according to claim 1, further comprising assigning a resonance of a first order to an eccentricity and/or an imbalance.

7. The method according to claim 1, further comprising assigning a resonance of a second order to an ovality.

8. The method according to claim 1, further comprising assigning a resonance of an n-order to a construction defect or a design defect of a n-order.

9. The method according to claim 1, further comprising assigning a resonance of non-integer orders to a non-linear effect.

10. The method according to claim 1, further comprising carrying out classification of the tire properties by comparing the generated curve with a reference curve.

11. The method according to claim 1, further comprising approximating curves of the individual orders via a quadratic equation.

12. The method according to claim 1, further comprising assigning an unevenness in material distribution to a quadratic part of the equation.

13. The method according to claim 1, further comprising assigning a speed proportional mechanism to a linear part of the equation.

14. The method according to claim 1, further comprising assigning a construction defect or a stiffness defect to a constant part of the equation.

15. A method for determination of tire properties in which a vehicle tire is rotatably mounted on a rim via a wheel bearing, an interior of the vehicle tire is pressurized by a fluid, the vehicle tire is subjected to a wheel load, the vehicle tire being accelerated to a final speed in accordance with a pre-determinable speed ramp, and the vehicle tire, in accordance with a tire speed, undergoes oscillation excitation and reacts to the oscillation excitation with an oscillation, and the method comprising:
continually capturing an effective tire force of the vehicle tire in the wheel bearing, due to the oscillation,
generating a data set, by applying a timing signal of the speed ramp to a Fourier transformation, which shows the tire force over the tire speed and tire frequency, and
generating an effective tire force by forming a quadratic average value of the captured tire force of one order.

16. The method according to claim 15, further comprising classifying the tire properties when the effective tire force is compared with an effective reference force.

17. A test stand for determination of tire properties, the test stand comprising a rim, a wheel bearing, means for applying pressure in a vehicle tire, means for applying the vehicle tire with a wheel load, means for accelerating the vehicle tire, means for capturing a tire speed, means for capturing of a tire power and/or a tire oscillation, the vehicle tire is rotatably mounted on the rim via the wheel bearing, an interior of the vehicle tire is pressurized with a fluid by the means for applying pressure in the vehicle tire, the vehicle tire is applied with a wheel load by the means to apply the vehicle tire with a wheel load, the vehicle tire is accelerated by the means for accelerating of the vehicle tire, in accordance with a predetermined speed ramp to the final speed so that the vehicle tire, in accordance with the tire speed, experiences oscillation excitation and reacts to the oscillation excitation with an oscillation, and where the tire speed is captured by the means to capture the tire speed,
a tire force which is present at the wheel bearing, due to the oscillation, is continuously captured by means of the capturing of the tire force and/or the tire or oscillation, and
the test stand further comprises electronic calculation devices, the electronic calculation devices are configured to generate a data set describing the tire force over the tire speed and over the tire frequency by subjecting a timing signal of the speed ramp to a Fourier transformation,
the test stand is configured to
assign an order of a resonance of the tire frequency occurring in the data set to a cause of the resonance, and
represent tire forces assigned to an oscillation of an order as a generated curve over the tire speed to determine an oscillation power by determining an area under the curve.

18. The test stand according to claim 17, wherein the test stand is configured to execute a method for determining tire properties, whereby the vehicle tire is rotatably mounted on the rim via the wheel bearing, the interior of the vehicle tire is pressurized by means of the fluid, the vehicle tire is subjected to a wheel load, the vehicle tire is accelerated to a final speed in accordance with a pre-determinable speed ramp, and the vehicle tire, in accordance with a tire speed, undergoes oscillation excitation and reacts to the oscillation excitation with an oscillation, wherein the test stand is configured to
continually capture an effective tire force of the vehicle tire in the wheel bearing due to the oscillation, and
generate a data set, by applying a timing signal of the speed ramp to a Fourier transformation, which shows the tire force over the tire speed and tire frequency.

* * * * *